United States Patent [19]
Arita et al.

[11] Patent Number: 5,971,093
[45] Date of Patent: Oct. 26, 1999

[54] POWER STEERING DEVICE

[75] Inventors: Tsunefumi Arita; Shiroh Suoh, both of Gifu-ken; Fumio Ikesugi; Satoshi Takahara, both of Oyama, all of Japan

[73] Assignee: Kayaba Industry Co., Ltd., Tokyo, Japan

[21] Appl. No.: 08/816,992

[22] Filed: Mar. 13, 1997

[30] Foreign Application Priority Data

Mar. 14, 1996 [JP] Japan .................................. 8-085928

[51] Int. Cl.⁶ ...................................................... B62D 5/06
[52] U.S. Cl. .......................................... 180/417; 180/442
[58] Field of Search .................................. 180/417, 421, 180/429, 442

[56] References Cited

U.S. PATENT DOCUMENTS

| 4,206,827 | 6/1980 | Adams ................................. 180/417 |
| 5,027,916 | 7/1991 | Rohringer et al. ....................... 180/417 |
| 5,515,938 | 5/1996 | Haga et al. ............................ 180/417 |
| 5,638,912 | 6/1997 | Haga et al. ............................ 180/417 |
| 5,845,737 | 12/1998 | Suzuki et al. ......................... 180/417 |

*Primary Examiner*—Lanna Mai
*Assistant Examiner*—Michael Cuff
*Attorney, Agent, or Firm*—Steinberg & Raskin, P.C.

[57] ABSTRACT

A power steering device capable of improving both operability of a vehicle and a feeling of the steering. The power steering device includes an association mechanism for mechanically associating a handle with wheels, a power cylinder for generating assisting force, and a control valve connected to the power cylinder and adapted to be changed over depending on torque inputted thereto from the handle and kept at a neutral position unless the torque is inputted thereto. The control valve functions to control the amount of fluid fed to the power cylinder when it is changed over and close a cylinder port connected to the power cylinder when it is at the neutral position.

2 Claims, 6 Drawing Sheets

POWER STEERING DEVICE

BACKGROUND OF THE INVENTION

This invention relates to a power steering device, and more particularly to a power steering device suitably used for a forklift and adapted to hold a steering angle when an operator looses his hold from a handle.

Conventionally, a vehicle such as a forklift or the like is generally mounted thereon with a power steering device of the full-hydraulic type generally constructed in such a manner as shown in FIG. 8. More particularly, the conventional power steering device includes a piston 101, which is operatively associated or connected at both ends with or to wheels (not shown) and arranged in a cylinder 102 in a manner to be slidable therein. The cylinder 102 has cylinder chambers 102a and 102b defined therein with the piston 101 being interposed therebetween. The cylinder chambers 102a and 102b are connected to cylinder ports 104a and 104b of a change-over valve 103.

The change-over valve 103 is provided with a pair of communication ports 105a and 105b, which are commonly connected to a trochoidal pump 106. The trochoidal pump 106 is operatively associated with a handle (not shown). When the handle is turned, the trochoidal pump functions to introduce fluid through a pressure port 106a or 106b thereinto and discharge fluid in an amount proportional to the number of turnings of the handle through the pressure port 106b or 106a.

Also, the change-over valve 103 includes a pump port 107 connected to a pump P and a tank port 108 connected through a filter 109 to a tank T.

In the change-over valve 103 thus constructed, the cylinder ports 104a and 104b are kept closed when the valve 103 is at a neutral position shown in FIG. 8.

The change-over valve 103 may comprise a rotary valve associated with the handle. The valve 103 may be constructed so as to be changed over depending on torque inputted thereto from the handle and kept at the neutral position unless torque is inputted thereto from the handle.

When the handle is operated to change over the change-over valve 103 to a change-over position 103a, the pump port 107 is permitted to communicate with the communication port 105a, so that fluid may be introduced from the pump P to the trochoidal pump 106. Then, the trochoidal pump 106 discharges fluid in an amount proportional to the number of turnings of the handle from the pressure port 106b.

Fluid discharged from the trochoidal pump 106 through the pressure port 106b is guided to the communication port 105b. The change-over position 103a permits the communication port 105b to communicate with the cylinder port 104b, so that fluid discharged from the trochoidal pump 106 is fed to the cylinder chamber 102b of the cylinder 102.

Also, the the change-over position 103a permits the cylinder port 104a connected to the chamber 102a of the cylinder 102 to communicate with the tank port 108, so that fluid in the chamber 102a is discharged to the tank T.

Such feeding of fluid to the chamber 102b and discharge of fluid in the chamber 102a lead to movement of the piston 101, to thereby generate power assisting force for steering of the wheels.

When an operator looses his hold of the handle while keeping the wheels at a position thus steered, the change-over valve 103 is held at a neutral position. Such holing of the valve at the neutral position causes the cylinder ports 104a and 104b to be closed, so that fluid is confined in the chambers 102a and 102b. This results in the steered position of the wheels being maintained against self aligning torque, to thereby permit the wheels to maintain a steering angle thus obtained even when any external force is applied to the wheels.

When the handle is turned in a reverse direction, the change-over valve 103 is changed over to a change-over position 103b and fluid is discharged through the pressure port 106a of the trochoidal pump 106. The fluid thus discharged is then fed to the chamber 102a of the cylinder 102 and fluid in the chamber 102b is discharged to the tank T.

In the conventional power steering device thus constructed, the trochoidal pump 106 associated with the handle is arranged for the purpose of metering the amount of fluid fed to the cylinder 102.

Unfortunately, such a trochoidal pump inherently causes leakage of fluid therefrom due to its inherent structural defect. When it is not possible to carry out steering of the wheels as seen during rest swing locking, the fluid leakage affects the handle, to thereby cause turning of the handle to continue.

Thus, the conventional power steering device of the full-hydraulic type often causes the handle to be turned independently from the wheels. This leads to misregistration between a neutral point of the handle and that of the wheels, so that an operator often fails to appropriately judge the neutral position of the handle based on a position of the handle.

Also, in the conventional power steering device, turning of the handle causes fluid in an amount proportional to the amount of turning of the handle to be suddenly fed from the trochoidal pump 106 to the cylinder 101, resulting in a feeling of the steering at the time when application of assisting force is started being deteriorated.

SUMMARY OF THE INVENTION

The present invention has been made in view of the foregoing disadvantage of the prior art.

Accordingly, it is an object of the present invention to provide a power steering device which is capable of mechanically associating a handle with wheels to constantly coincide a neutral point of the handle and that of the wheels with each other.

It is another object of the present invention to provide a power steering device which is capable of improving a feeling of steering by the device.

In accordance with the present invention, a power steering device is provided, which generally includes an association mechanism for mechanically associating a handle with wheels, a power cylinder for generating assisting force, and a control valve connected to the power cylinder and changed over depending on torque inputted thereto from the handle to control the amount of fluid fed to the power cylinder. The power steering device of the present invention is featured in that the control valve is kept neutral unless torque is inputted thereto from the handle, resulting in a cylinder port connected to the power cylinder being closed.

In a preferred embodiment of the present invention, the control valve includes a first control section which carries out overlap and controls the amount of a first part of fluid discharged from the pump (hereinafter also referred to "pump discharge fluid") fed to the power cylinder and a second control section which carries out underlap and controls the amount of a second part of the pump discharge fluid returned to a tank. The first and second control sections are connected in parallel to each other and so constructed that the amount of underlap of the second control section is set to be larger than that of overlap of the first control section.

Also, in a preferred embodiment of the present invention, the association mechanism includes a casing, a stub shaft associated with the handle, bearings for supporting the stub shaft in the casing in a manner to be rotatable and movable in an axial direction thereof, a ball screw arranged on the stub shaft, a ball nut engaged through balls with the ball screw and a sector gear associated with the wheels. The sector gear is engaged with a rack formed on the ball nut in the casing. The control valve is constituted by a sliding valve including a sleeve arranged in the casing, a spool slid in the sleeve due to movement of the stub shaft in an axial direction thereof and a centering spring for the spool at a neutral position.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 5 is a schematic sectional view showing a sliding valve incorporated in a fourth embodiment of a power steering device according to the present invention;

DETAILED DESCRIPTION OF THE PREFERRED EMBODIMENTS

Now, a power steering device according to the present invention will be described hereinafter with reference to FIGS. 1 to 7.

Figure 1:
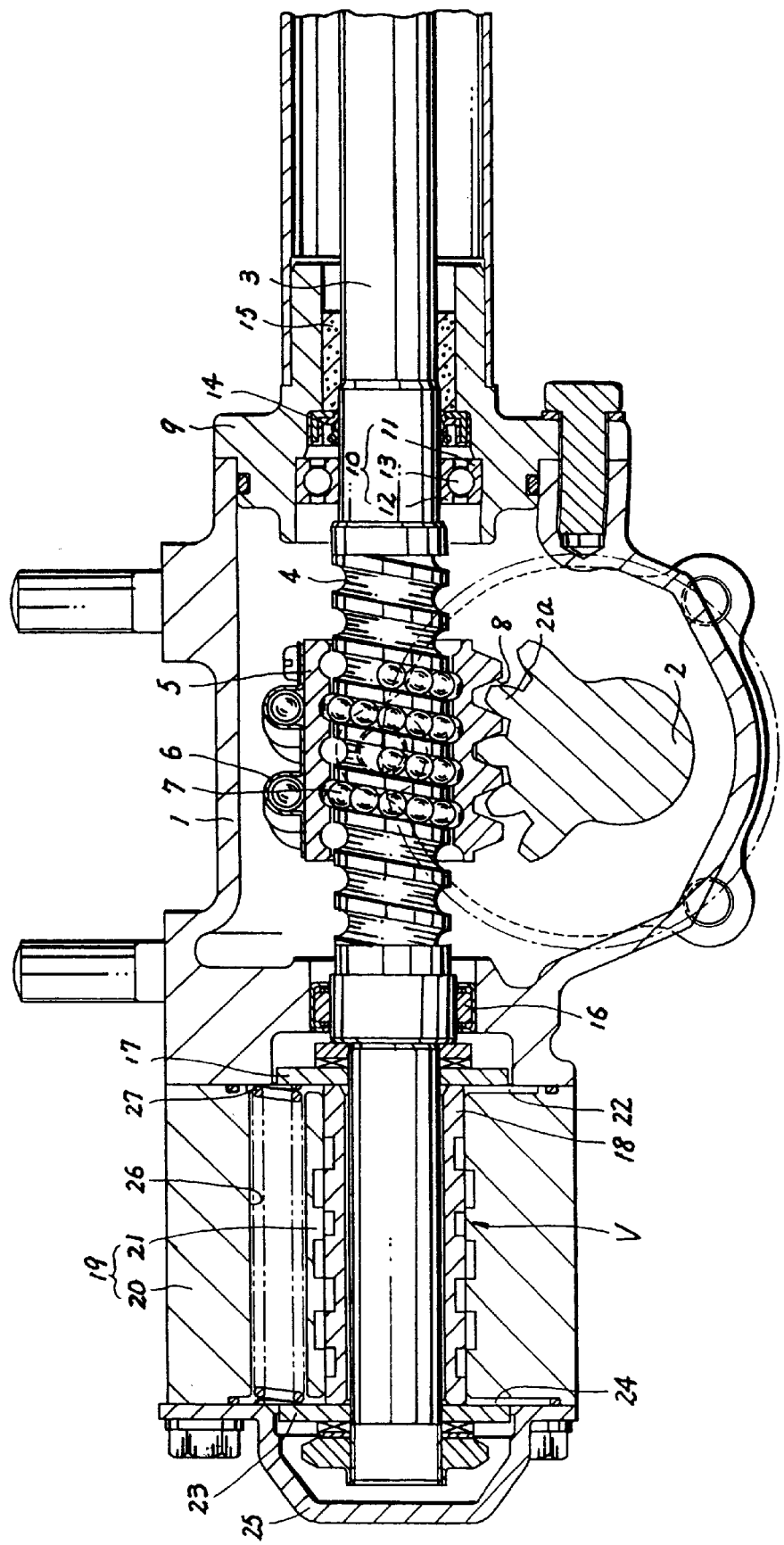
FIG. 1 is a sectional view showing a first embodiment of a power steering device according to the present invention.
Figure 2:
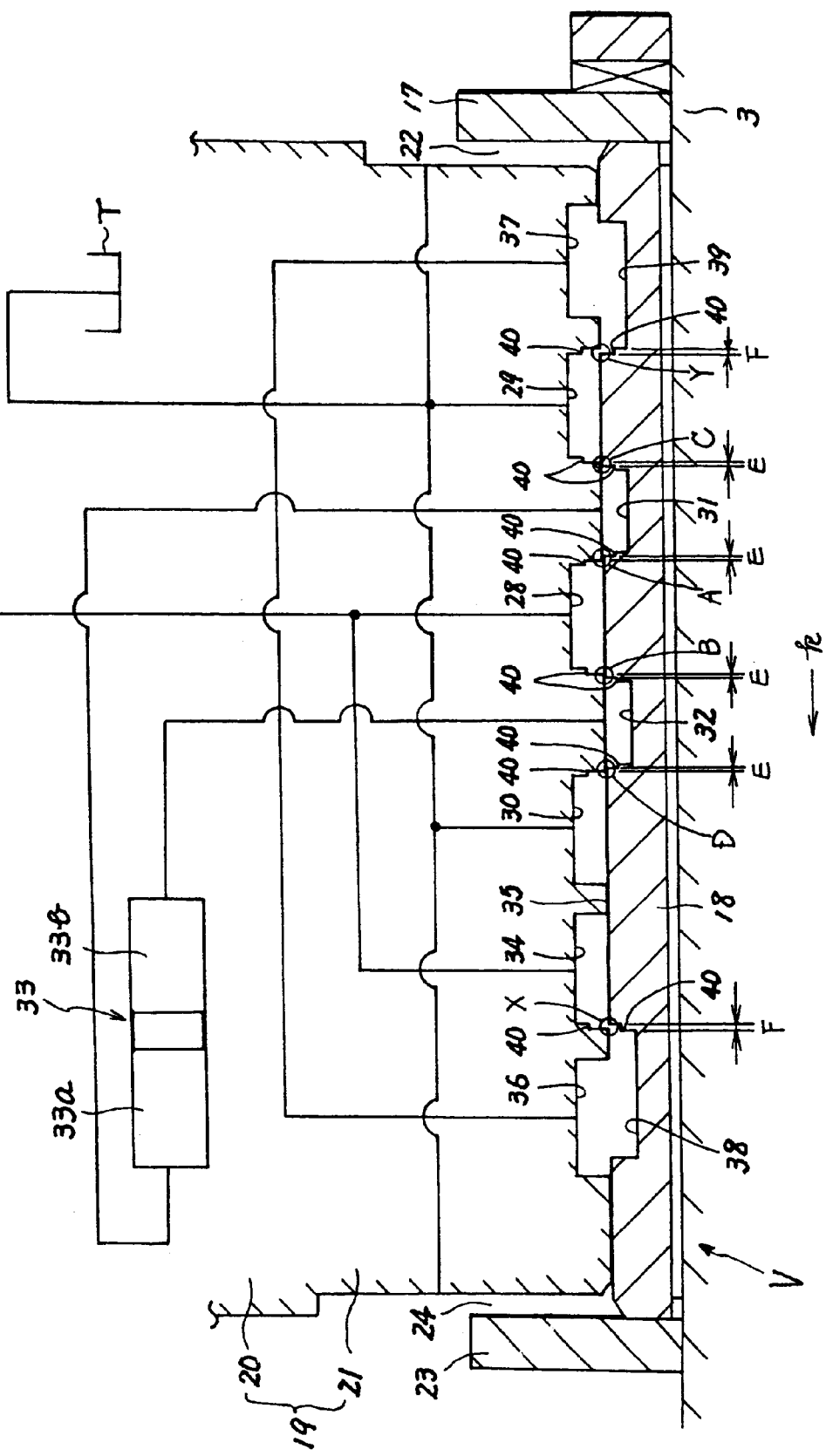
FIG. 2 is a schematic sectional view showing a sliding valve incorporated in the power steering device of FIG. 1.
Figure 3:
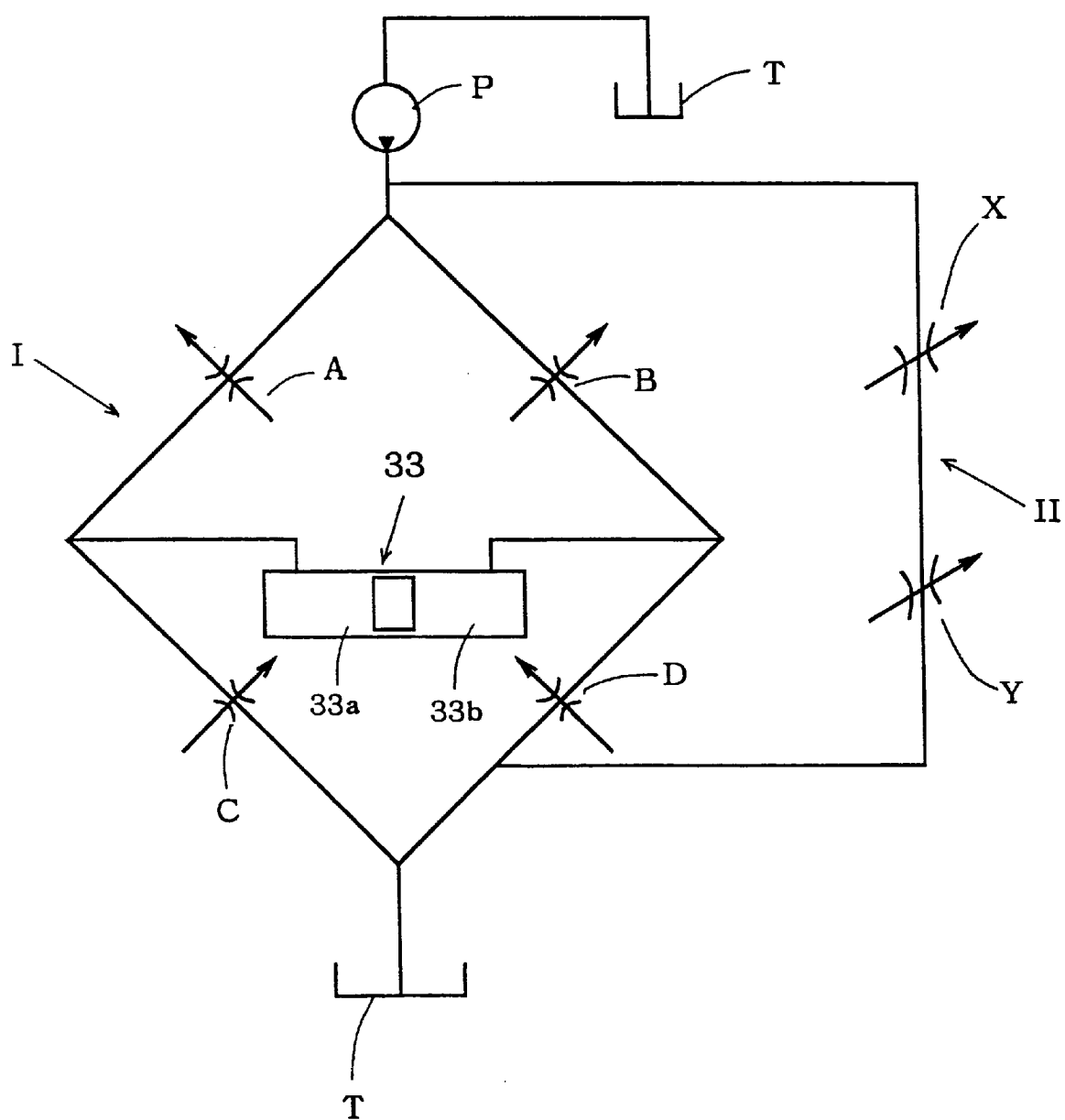
FIG. 3 is a circuit diagram showing each of first to fifth embodiments of a power steering device according to the present invention.

Referring first to FIGS. 1 to 3, a first embodiment of a power steering device according to the present invention is illustrated. A power steering device of the illustrated embodiment, as shown in FIG. 1, includes a housing 1 and a sector gear 2 formed with teeth 2a and arranged in the housing 1. The sector gear 2 is operatively connected to or associated with wheels through a pitman arm (not shown) or the like.

The power steering device of the illustrated embodiment also includes a stub shaft 3 connected to or associated with handles (not shown) and inserted into the housing 1. The stub shaft 3 is formed thereon with a ball screw 4 having a predetermined lead angle. The ball screw 4 is mounted thereon with a ball nut 5 in a manner to be coaxial with the stub shaft 3. Between the ball nut 5 and the ball screw 4 are interposedly arranged a plurality of balls 7 in a manner to be freely circulated therebetween through a ball tube 6.

The ball nut 5 is formed thereon with a rack 8, which are engaged with the teeth 2a of the sector gear 2, to thereby mechanically connect or associate the handle to or with the wheels.

The stub shaft 3 is supported in a plug 9 fixedly mounted on one end of the housing 1 by means of a bearing 10. The bearing 10 includes an outer race 11, an inner race 12 for supporting the stub shaft 3 therein and balls 13 interposedly arranged between the outer race 11 and the inner race 12. The bearing 10 functions to rotatably support the stub shaft 3 therein while permitting stub shift 3 to be slidable in an axial direction thereof. Ball bearing 10 does not move in the axial direction since outer race 11 is press-fit in the plug 9 and held stationary. On the other hand, stub shaft 3 is not press-fit but merely inserted into the inner race 12 and thus movable with respect to the inner race 12 of ball bearing 10. Stub shaft 3 is controlled so as not to rattle in the radial direction but it is allowed to slide and move within inner race 12 in the axial direction. The plug 9 is provided therein with a seal member 14 to prevent leakage of fluid from the plug 9. Also, grease 15 is charged between the plug 9 and the stub shaft 3 to ensue smooth movement of the stub shaft 3.

The stub shaft 3 is supported by a bearing 16 arranged between the housing 1 and the stub shaft 3. The bearing 16 likewise supports the stub shaft 3 therein while permitting it to be slidable in an axial direction thereof. In a similar manner as the inner race 12 of bearing 10 above, the stub shaft 3 is allowed to move in the axial direction by sliding along the inner peripheral surface of bearing 16.

The stub shaft 3 is mounted thereon with a thrust washer 17, which is arranged so as to be flush with an end surface of the other end of the housing 1. The stub shaft 3 is provided on an outer periphery of a portion thereof outwardly projected from the housing 1 with a spool 18, which is abutted at one end thereof against the thrust washer 17.

The housing 1 is securely mounted on the other end thereof with a valve body 19 of a cylindrical shape, which includes an outer section 20 formed into the same length as the spool 18 and an inner section 21 formed into a length smaller than that of the spool 18. The inner section 21 has the spool 18 slidably incorporated therein and is arranged so as to define a gap 22 between the thrust washer 17 and the inner section 21.

The stub shaft 3 is also mounted thereon with an additional thrust washer 23, against which the spool 18 is abutted at the other end thereof. Thus, the spool 18 is arranged substantially in a manner to be interposed between the thrust washers 17 and 23. Likewise, a gap 24 is defined between the thrust washer 23 and the inner section 21.

The valve body 19 is fixedly mounted on an end thereof with s cover 25. Mounting of the cover 25 is carried out while keeping the thrust washer 23 flush with a surface of the cover.

Also, the valve body 19 is formed therein with a spring hole 26, in which a centering spring 27 is arranged in a manner to be abutted at one end thereof against both the other end of the housing 1 and the thrust washer 17 and at the other end thereof against both the cover 25 and thrust washer 23. Thus, the spool 18 is kept at such a neutral position as shown in FIG. 1 by elastic force of the centering spring 27. The elastic force of the centering spring 27 acts in the direction of the axis of stub shaft 3. (A part of the elastic force also acts on the ball bearing 10 through the sliding friction with the stub shaft 3 but the ball bearing 10 is not moved to a great extent by such elastic force.) Also, movement of the stub shaft 3 in the axial direction thereof permits the spool 18 to carry out stroke in the inner section 21 against the centering spring 27. The quantity of stroke of the spool 18 is regulated within a range of the gaps 22 and 24.

Thus, the inner section 21 of the valve body 19 and the spool 18 slidably arranged in the inner section 21 cooperate with each other to provide a sliding valve V acting as a control valve.

The inner section 21 is formed on an inner peripheral surface thereof with ports and likewise the spool 18 is formed on an outer peripheral surface thereof with ports, as shown in FIG. 2.

More particularly, the inner section 21 is formed thereon with a first pump port 28 connected to a pump P. Also, the inner section 21 is formed with tank ports 29 and 30, which are connected to a tank T and arranged so as to interpose the first pump port 28 therebetween. The spool 18 is formed with a pair of cylinder ports 31 and 32, which are arranged between the first pump port 28 and the tank port 29 and between the first pump port 28 and the tank port 30, respectively. The cylinder port 31 is arranged so as to communicate with a chamber 33a of a power cylinder 33 connected to the wheels and the cylinder port 32 is arranged so as to communicate with a chamber 33b of the power cylinder 33.

Supposing that the sliding valve V is at the neutral position shown in FIG. 2, overlap occurs between the first pump port 28 and each of the cylinder ports 31 and 32. Likewise, overlap occurs between the cylinder ports 31 and 32 and the tank ports 29 and 30. The amount of such overlap is indicated by reference character E in FIG. 2.

Thus, the first pump port 28, cylinder ports 31 and 32, and tank ports 29 and 30 cooperate with each other to provide variable constrictions A to D, which provide, in cooperation with each other, a first control section I for controlling the amount of a part of fluid discharged from the pump P (pump discharge fluid) fed to power cylinder 33.

The inner section 21 is formed with a second pump port 34, which is positioned adjacently to the tank port 30. The second pump port 34 is interrupted from the tank port 30 by means of a block section 35. Also, the inner section 21 is formed at one end thereof with a by-pass port 36 in a manner to be positioned adjacently to the second pump port 34. Further, the inner section 21 is formed at the other end thereof with a return port 37, which is connected to the by-pass port 36.

The spool 18 is formed at one end thereof with a first communication port 38, which is adapted to constantly communicate with the by-pass port 36. When the sliding valve V is at the neutral position shown in FIG. 2, the communication port 38 and second pump port 34 are permitted to form underlap therebetween. The spool 18 is formed at the other end thereof with a second communication port 39, which is adapted to constantly communicate with the return port 37. When the sliding valve V is at the neutral position shown in FIG. 2, the communication port 39 and the tank port 29 of the first control section I are permitted to form underlap therebetween. The amount of such underlap is indicated by reference character F in FIG. 2 and defined to be larger than that of the overlap E obtained in the first control section I.

Thus, the second pump port 34, by-pass port 36, return port 37 and communication ports 38 and 39 cooperate with each other to provide variable constrictions X and Y, which constitute a second control section II in cooperation with each other. The second control section II thus provided functions to control the amount of a part of the pump discharge fluid returned to the tank T.

In the first and second control sections I and II, sides of the ports constituting the variable constrictions A to D, X and Y each are formed with a step 40, which serves to improve rising of flow characteristics.

Also, the sliding valve V, as described above, is so constructed that the gaps 22 and 24 between the thrust washer 17, 23 and the inner section 23 communicate with the tank T.

Referring to FIG. 3, a circuit of the power steering device of the illustrated embodiment constructed as described above is illustrated. The control valve, as shown in FIG. 3, includes the first control section I constituted by the variable constrictions A to D and the second control section II constituted by the variable constrictions X and Y which are connected in parallel to each other.

Now, the manner of operation of the power steering device of the illustrated embodiment will be described hereinafter.

The sliding valve V is kept at the neutral position shown in FIG. 2 unless the handle is turned, therefore, the first control section carries out overlap to close the cylinder ports 31 and 32. This permits fluid to be confined in the chambers 33a and 33b of the power cylinder 33, to hold the wheels, so that a steering angle of the wheels may be held even when any external force is applied to the wheels.

Concurrently, the second control section II carries out underlap, so that fluid discharged from the pump P is guided through the second pump port 34, communication port 38, by-pass port 36, return port 37 and communication port 39 to the tank port 29, resulting in whole fluid being returned to the tank T.

Then, supposing that the handle (not shown) is turned, turning force of the handle is transmitted from the stub shaft 3 through the ball screw 4 and balls 7 to the ball nut 5 in FIG. 1. However, the ball nut 5 is engaged with the sector gear 2, so that the ball nut 5 fails to be moved when the sector gear 2 is kept from being moved due to ground resistance on a wheel side or the like. Thus, the turning force acts on the ball screw 4 and therefore the stub shaft 3 as reaction force through the ball nut 5. The reaction force permits the stub shaft 3 to be moved in an axial direction thereof while revolving along a lead angle of the ball screw 4.

Thus, turning of the handle permits the stub shaft 3 to be moved in the axial direction thereof depending on load on the wheel side, resulting in the spool 18 being slidably moved in the inner section 21, leading to changing-over of the sliding valve V.

Now, supposing that the spool is moved in a direction indicated at an arrow k in FIG. 2, to thereby carry out stroke exceeding a distance E in the inner section 21, opening of the variable constriction A and communication of the cylinder port 31 with the first pump port 28 are carried out in the first control section I. Also, in the first control section II, the variable constriction D is rendered open and the cylinder port 32 is permitted to communicate with the tank port 30. Thus, fluid is introduced into the chamber 33a of the power cylinder 33 and fluid in the chamber 33b is discharged, resulting in application of assisting force starting.

As described above, the amount of underlap F is set to be larger than the amount of overlap E, so that the variable constrictions Y and X are kept open in the second control section II. Thus, some of pump discharge fluid or fluid discharged from the pump is returned to the tank T.

Thus, some of pump discharge fluid is returned to the tank T at the time when application of the assisting force starts, so that an increase in assisting force is rendered slow.

Then, supposing that the spool 18 carries out stroke exceeding a distance F in a direction indicated at an arrow k in FIG. 2, opening of the variable constrictions A and D is further increased in the first control section I. Also, in the second control section II, the variable constriction X is closed, all of pump discharge fluid is fed to the first control section I or power cylinder 33.

Thus, when the spool 18 carries out stroke exceeding a distance F, pump discharge fluid is kept from being returned to the tank T, so that application of assisting force in a sufficient amount may be realized.

When the spool 18 carries out stroke in a direction opposite to the direction of the arrow k, the variable constrictions B and C are increased in opening in the first control section I and the variable constriction Y is reduced in opening in the second control section II. This exhibits the same action as described above.

Subsequently, supposing that operator looses his hold of the handle kept turned, there occurs a variation from a state that assisting force is applied depending on load to a state that any load is kept from being applied to the sector gear 2, so that reaction force of the ball nut 5 is kept from acting on the stub shaft 3. Therefore, elastic force of the centering spring 27 permits the stub shaft 3 to be returned to the neutral position along the lead angle of the ball screw 4, resulting in the sliding valve V being returned to the neutral position.

Returning of the sliding valve V to the neutral position shown in FIG. 2 permits the first control section I to keep the overlap, to thereby close the cylinder ports 31 and 32, resulting in feeding of fluid to the power cylinder 33 being interrupted. Therefore, fluid is confined in the chambers 33a and 33b of the power cylinder 33, resulting in the position of the wheels being maintained against self aligning torque, so that the steering angle is held even when any external force is applied to the handle from the wheel side.

In this instance as well, the second control section II carries out the underlap, so that fluid discharged from the pump P is guided through the second pump port 34, communication port 38, by-pass port 36, return port 37 and communication port 39 to the tank port 29, thus, all of the pump discharge fluid is returned to the tank T.

The power steering device of the first embodiment constructed as described above permits the sliding valve V to be changed over depending on torque inputted thereto from the handle, to thereby generate assisting force depending on load. Also, it keeps the sliding valve V at the neutral position unless load is applied from the handle to the device, to thereby close the cylinder ports 31 and 32, resulting in the position of the wheels being maintained against self aligning torque, so that the steering angle is held even when any external force is applied to the handle from the wheel side.

The power steering device of the illustrated embodiment which exhibits such a power steering function mechanically associates the handle with the wheels, to thereby effectively prevent misregistration between a neutral point of the handle and that of the wheels. Thus, observation of the handle is merely required to judge whether the wheels are at the neutral point, so that the power steering device may contribute to an increase in operability of a vehicle.

Also, the power steering device of the illustrated embodiment permits an increase in assisting force to be slow when application of the assisting force is started and ensures subsequent application of assisting force in a sufficient amount, resulting in a feeling of the steering being improved.

Figure 4:
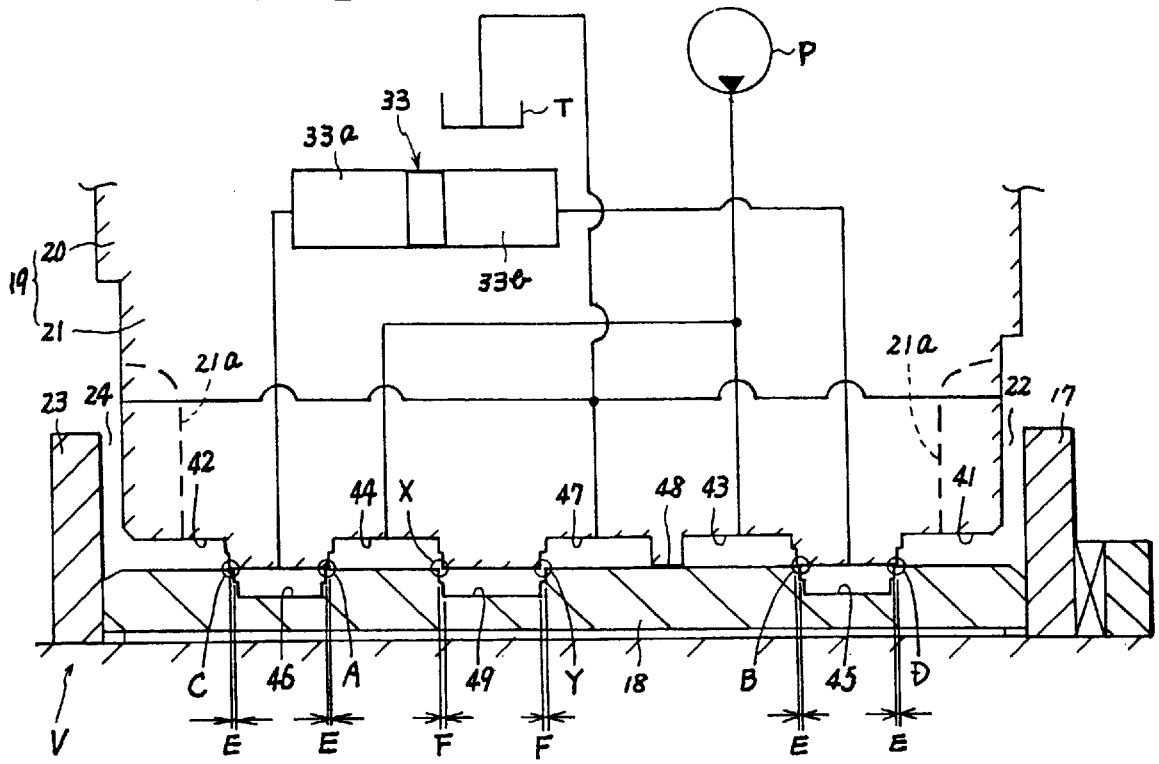
FIG. 4 is a schematic sectional view showing a sliding valve incorporated in a second embodiment of a power steering device according to the present invention.

Referring now to FIG. 4, a second embodiment of a power steering device according to the present invention is illustrated. In a power steering device of the second embodiment, ports of a sliding valve V are arranged in a manner different from those in the first embodiment described above. More particularly, an inner section 21 is formed on both ends thereof with tank ports 41 and 42, which are arranged so as to communicate directly with gaps 22 and 24 through cutouts 21a formed at a part of a circumference of the inner section 21, respectively. The gaps 22 and 24 are formed so as to communicate with a tank T. The inner section 21 is also formed with pump ports 43 and 44 in a manner to be in proximity to the tank ports 41 and 42, respectively.

The spool 18 is formed with a pair of cylinder ports 45 and 46, wherein the cylinder port 45 is arranged between the pump port 43 and the tank port 41 and the cylinder port 46 is arranged between the pump port 44 and the tank port 42.

The ports 41 to 46 cooperate with each other to constitute variable constrictions A to D which provide a first control section I in cooperation with each other. The amount of overlap in each of the variable constrictions A to D is indicated at reference character E in FIG. 4.

Also, the inner section 21 is formed with a return port 47, which is positioned between the pump port 43 and 44. The return port 47 is interrupted from the pump port 43 by means of a block section 48. The spool 18 is formed with a communication port 49, which is arranged between the pump port 44 and the return port 47.

The ports 44, 47 and 49 cooperate with each other to constitute variable constrictions X and Y, which provide a second control section II in cooperation with each other. The amount of underlap in each of the variable constrictions X and Y is indicated at reference character F in FIG. 4 (F>E).

The second embodiment is constructed so as to reduce the number of ports as compared with the first embodiment described above.

More specifically, the second embodiment the return port 47 of the second control section II is formed adjacently to the pump port 44, to thereby permit the pump port 44 to communicate with the return port 47 through the communication port 49. Therefore, the second embodiment eliminates the by-pass port 36 and the communication port 38 communicating the by-pass port 36 which are arranged in the first embodiment, to thereby reduce the number of ports correspondingly. A decrease in the number of ports leads to a reduction in manufacturing cost of the power steering device and a decrease in length of the sliding valve V in an axial direction thereof to a degree sufficient to realize downsizing of the device.

The remaining part of the second embodiment may be constructed in substantially the same manner as the first embodiment described above.

Figure 5:
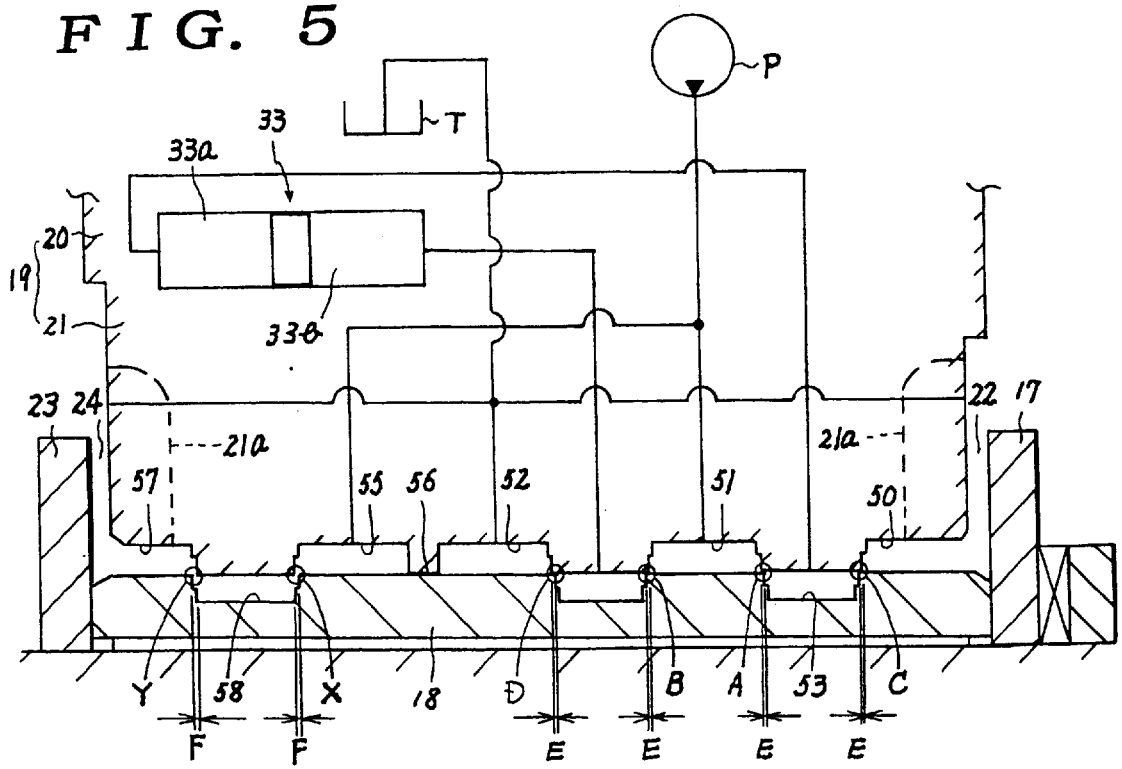
FIG. 5 is a schematic sectional view showing a sliding valve incorporated in a third embodiment of a power steering device according to the present invention.

Referring now to FIG. 5, a third embodiment of a power steering device of the present invention is illustrated. In a power steering device of the third embodiment as well, ports of a sliding valve V are arranged in a manner different from those in the first embodiment described above.

In the third embodiment, an inner section 21 is formed at an end thereof with a tank port 50, which is arranged so as to communicate directly with a gap 22 through a cutout 21a formed at a part of a circumference of the inner section 21. The gap 22 is formed so as to communicate with a tank T. Also, the inner section 21 is formed with a first pump port 51 in a manner to be adjacent to the tank port 50 and a tank port 52 in a manner to be in proximity to the first pump port 51.

A spool 18 is formed with a pair of cylinder ports 53 and 54, wherein the cylinder port 53 is arranged between the first pump port 51 and the tank port 50 and the cylinder port 54 is arranged between the first pump port 51 and the tank port 52.

The ports 51 to 54 cooperate with each other to provide variable constrictions A to D, which constitute a first control section I in cooperation with each other. The amount of overlap in each of the variable constrictions A to D is likewise indicated at reference character E in FIG. 5.

Also, the inner section 21 is formed with a second pump port 55 in a manner to be adjacent to the tank port 52. The second pump port 55 is interrupted from the tank port 55 by means of a block section 56. The inner section 21 is formed at an end thereof with a return port 57, which is arranged so as to communicate directly with a gap 24 through a cutout 21a arranged at a part of a circumference of the inner section 21. The gap 24 is arranged so as to communicate with a tank T.

The spool 18 is formed with a communication port 58, which is arranged between the second pump port 55 and the return port 57.

The ports 55, 57 and 58 cooperate with each other to provide variable constrictions X and Y, which constitute a second control section II in cooperation with each other. The amount of underlap in each of the variable constrictions X and Y is indicated at reference character F in FIG. 5 (F>E).

Thus, the third embodiment likewise permits the number of ports to be reduce, leading to a reduction in manufacturing cost of the power steering device and a decrease in length of the sliding valve V in an axial direction thereof to a degree sufficient to realize downsizing of the device.

The remaining part of the third embodiment may be constructed in substantially the same manner as the first embodiment described above.

Figure 6:
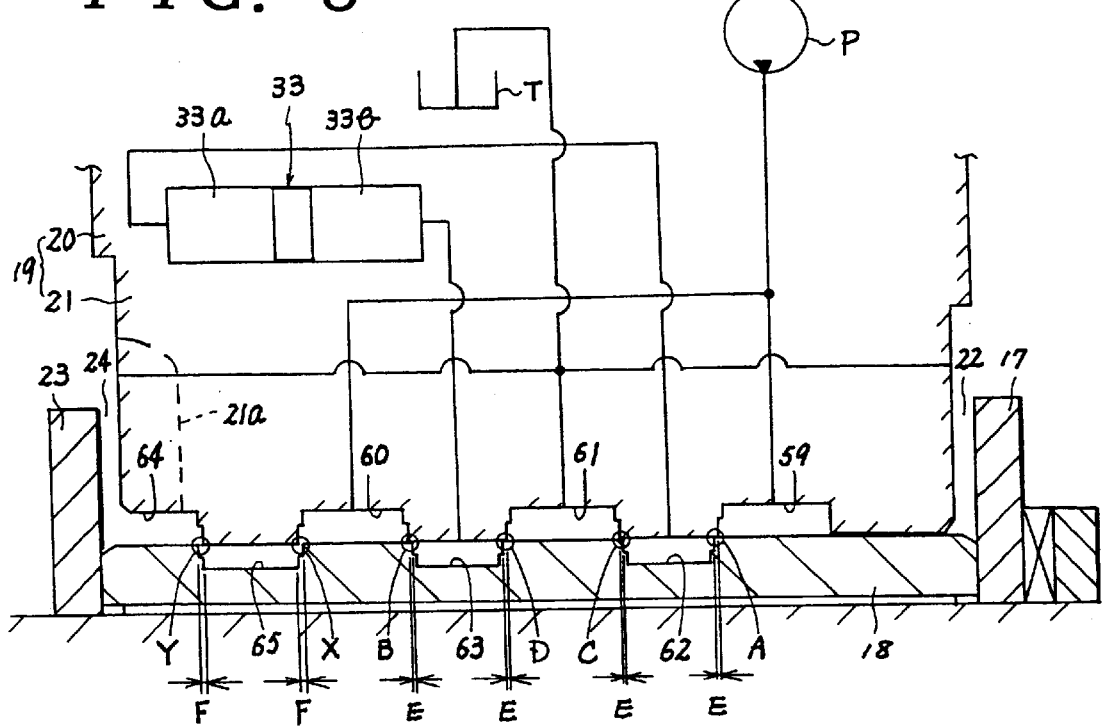
FIG. 6 is a schematic sectional view showing a sliding valve incorporated in a fourth embodiment of a power steering device according to the present invention.

Referring now to FIG. 6, a fourth embodiment of a power steering device of the present invention is illustrated. In a power steering device of the third embodiment as well, ports of a sliding valve V are arranged in a manner different from those in the first embodiment described above.

In the fourth embodiment, an inner section 21 is formed with a pair of pump ports 59 and 60. Also, the inner section 21 is formed with a tank port 61, which is positioned between the pump ports 59 and 60.

A spool 18 is formed with a pair of cylinder ports 62 and 63, wherein the cylinder port 62 is arranged between the pump port 59 and the tank port 61 and the cylinder port 63 is arranged between the pump port 60 and the tank port 61.

The ports 59 to 63 thus formed cooperate with each other to provide variable constrictions A to D, which constitute a first control section I in cooperation with each other. The amount of overlap in each of the variable constrictions A to D is likewise indicated at reference character E in FIG. 6.

Also, the inner section 21 is formed with a return port 64, which is arranged so as to communicate directly with a gap 24 through a cutout 21a formed at a part of a circumference of the inner section 21. The gap 24 is formed so as to communicate a tank T. The spool 18 is formed with a communication port 65, which is arranged between the pump port 60 and the return port 64.

The ports 60, 64 and 65 cooperate with each other to define variable constrictions X and Y, which constitute a second control section II in cooperation with each other. The amount of underlap in each of the variable constrictions X and Y is indicated at reference character F in FIG. 6 (F>E).

Thus, it will be noted that the fourth embodiment further reduces the number of ports as compared with the second and third embodiment as well as the first embodiment. More specifically, in the first control section I, the tank port 61 is arranged so as to be common to the cylinder ports 62 and 63, resulting in only one tank port being merely required. Therefore, the fourth embodiment further contributes to a reduction in manufacturing cost and downsizing of the power steering device.

Figure 7:
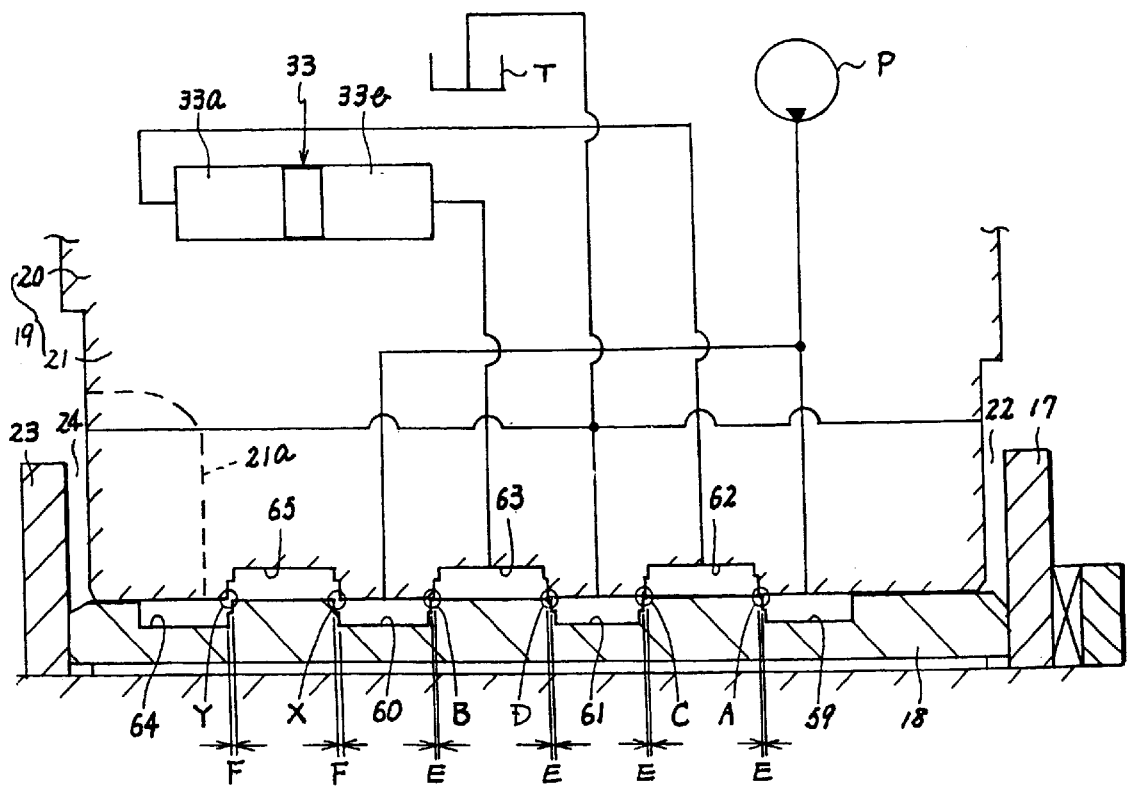
FIG. 7 is a schematic sectional view showing a sliding valve incorporated in a fifth embodiment of a power steering device according to the present invention.
Figure 8:
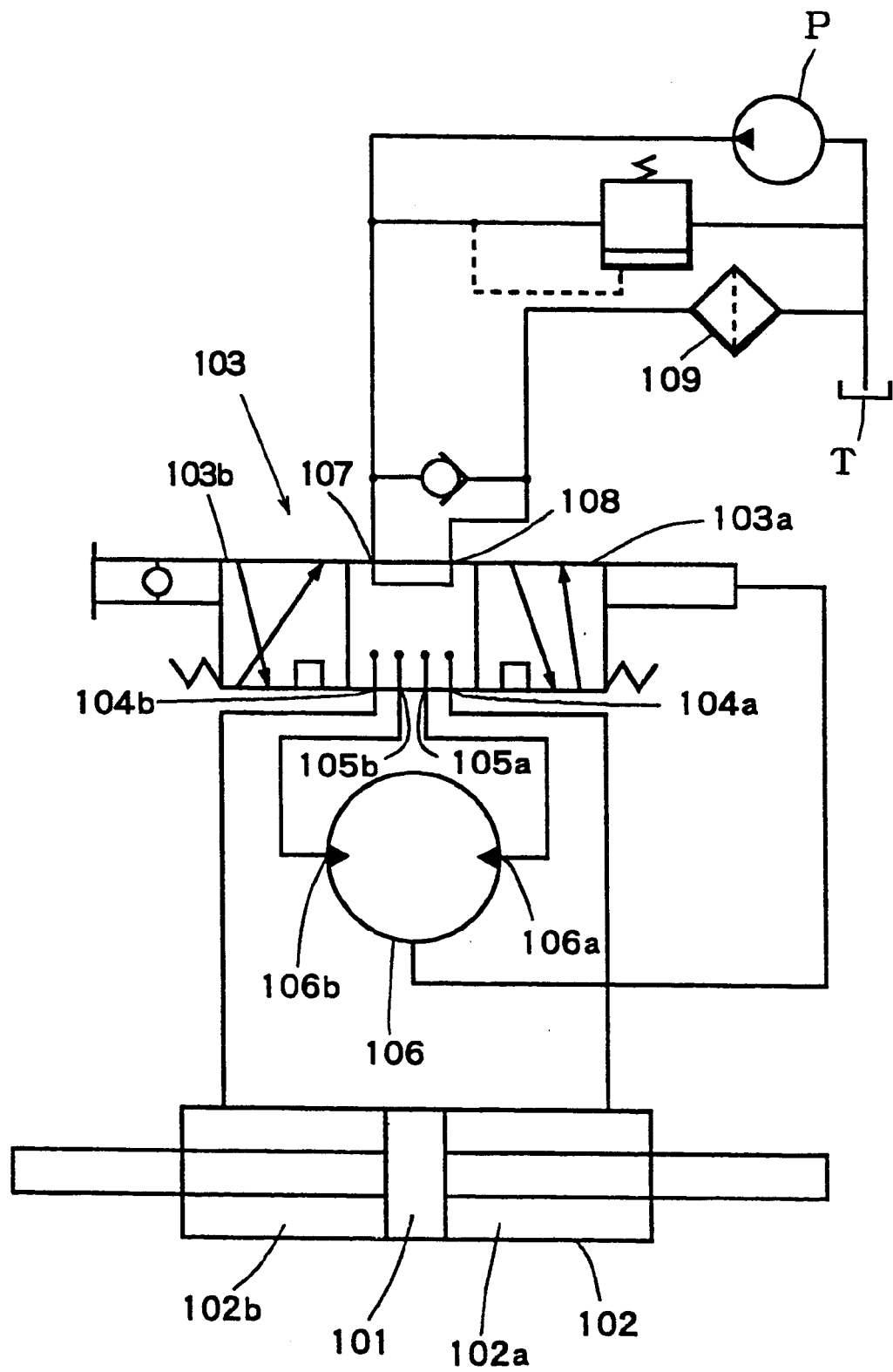
FIG. 8 is a circuit diagram showing a conventional power steering device.

Referring now to FIG. 7, a fifth embodiment of a power steering device according to the present invention is illustrated. In a power steering device of the fifth embodiment, ports 59, 60, 61 and 64 are formed on a spool 18 rather than an inner section 21 unlike the fourth embodiment described above. Also, ports 62, 63 and 65 are formed on the inner section 21 rather than the spool 18. Such construction of the fifth embodiment likewise reduces both the number of ports and leakage in an inside of the device.

Also, the fifth embodiment is constructed so as to contact both ends of the spool 18 with the inner section 21, unlike each of the second to fourth embodiments wherein the spool 18 is formed on the end thereof with the tank port or return port. Thus, supporting of the spool 18 is rigidly carried out, resulting in backlash of the spool 18 being effectively prevented.

The first to fifth embodiments described above each are so constructed that the housing 1, plug 9, valve body 19 and cover 25 provide the casing in cooperation with each other and the inner section 21 of the valve body 19 constitutes a sleeve of the sliding valve V. Also, in each of the embodiments, the sector gear 2, stub shaft 3, ball screw 4 and ball nut 5 cooperate with each other to provide the mechanical association mechanism for mechanically associating the handle with the wheels.

Alternatively, the association mechanism may be constructed into a rack/pinion structure. In this instance, the control valve may comprise a rotary valve or the like. The rotary valve may be provided with a first control section for controlling a part of pump discharge fluid fed to the power cylinder and a second control section for controlling a part of the pump discharge fluid returned to the tank, wherein the first and second control sections are connected in parallel to each other and the amount of underlap in the second control section is set to be larger than the amount of overlap in the first control section.

As can be seen from the foregoing, the power steering device of the present invention is so constructed that the control valve is kept neutral unless torque is inputted thereto from the handle, resulting in the cylinder port connected to the power cylinder being closed. Such construction permits inputting of torque from the handle thereto to change over the control valve, resulting in application of assisting force depending on load being accomplished. Also, when torque is not inputted to the device from the handle, the steering angle is kept unvaried even when any external force is applied thereto. Also, arrangement of the association mechanism prevents misregistration between the neutral point of the handle and that of the wheels, to thereby improve operability of a vehicle.

In addition, in the power steering device of the present invention, the first and second control sections may be connected in parallel to each other and so constructed that the amount of underlap in the second control section is set to be larger than that of overlap in the first control section. Such construction permits assisting force to be gradually increased when application of the assisting force is started, resulting in a feeling of the steering being improved.

Further, in the power steering device of the present invention, the association mechanism may have the ball nut which is engaged through the balls with the ball screw incorporated therein, resulting in smooth handle operation being ensured.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A power steering device comprising:
   an association mechanism for mechanically associating an handle with wheels;
   a power cylinder for generating assisting force;
   at least one cylinder port connected to said power cylinder; and
   a control valve connected to said power cylinder and changed over depending on torque inputted thereto from the handle to control the amount of fluid fed to said power cylinder;
   said control valve being kept neutral unless torque is inputted thereto from the handle;
   said control valve having a first control section and a second control section;
   said first control section being arranged to carry out overlap and control the amount of a first part of a pump discharge fluid fed into said power cylinder;
   said second control section being arranged to carry out underlap and control the amount of a second part of the pump discharge fluid returned to a tank;
   said first control section and said second control section being connected in parallel to each other and constructed to provide a larger amount of underlap of said second control section than the amount of overlap of said first control section such that when said control valve is neutral, said at least one cylinder port is closed and pump discharge fluid is confined in said power cylinder.

2. A power steering device as defined in claim 1, wherein said association mechanism includes a casing, a stub shaft associated with the handle, bearings for supporting said stub shaft in said casing in a manner to be rotatable and movable in an axial direction thereof, a ball screw arranged on said stub shaft, a ball nut engaged through balls with said ball screw and a sector gear associated with the wheels;
   said sector gear being engaged with a rack formed on said ball nut in said casing; and
   said control valve is constituted by a sliding valve including a sleeve arranged in said casing, a spool slid in said sleeve due to movement of said stub shaft in an axial direction thereof and a centering spring for said spool at a neutral position.

* * * * *